A. HAMILTON.
STUMP SAWING MACHINE.
APPLICATION FILED MAY 12, 1919.
1,330,940.
Patented Feb. 17, 1920.
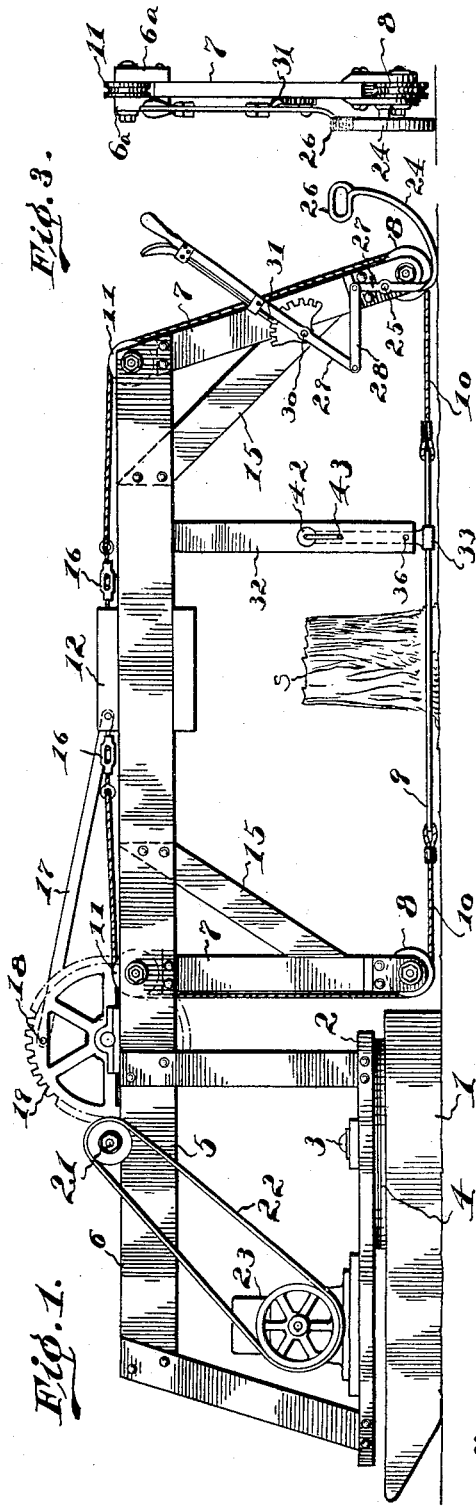
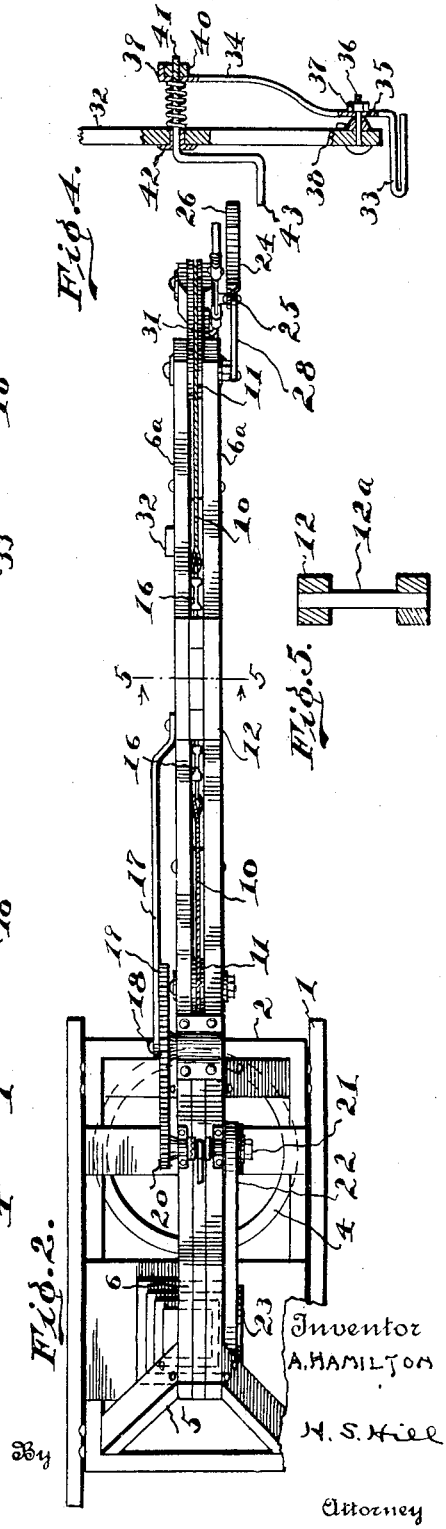
Inventor
A. HAMILTON
H. S. Hill
Attorney

UNITED STATES PATENT OFFICE.

ARTHUR HAMILTON, OF HARRISBURG, ARKANSAS.

STUMP-SAWING MACHINE.

1,330,940.  Specification of Letters Patent.  Patented Feb. 17, 1920.

Application filed May 12, 1919. Serial No. 296,488.

*To all whom it may concern:*

Be it known that I, ARTHUR HAMILTON, a citizen of the United States, residing at Harrisburg, in the county of Poinsett, State of Arkansas, have invented a new and useful Stump-Sawing Machine; and I do hereby declare the following to be a full, clear, and exact description of the invention, such as will enable others skilled in the art to which appertains to make and use the same.

The present invention relates to a stump sawing machine and has for its object to provide a device of this character which is portably mounted so that it can be readily drawn across a field and brought into proper position for operating upon any desired stump, and which embodies novel features of construction whereby the stump may be cut substantially level with the ground, this being necessary when clearing land for rice and very beneficial and desirable when removing stumps for any purpose.

Further objects of the invention are to provide a stump saw of this character which is power driven and can be operated by a single man, which will save all of the back breaking work incident to the manual operation of a cross cut saw, and which can be adjusted to bring the saw into position for operating upon the stump in the most effective manner.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a stump sawing machine constructed in accordance with the invention, showing the same in operative position for cutting off a stump substantially level with the surface of the ground.

Fig. 2 is a top plan view thereof, a portion of the sled upon which the saw is mounted being broken away.

Fig. 3 is an end view.

Fig. 4 is a detail view of the saw guide, portions being broken away and shown in section.

Fig. 5 is a sectional view through the cross head on the line 5—5 of Fig. 2.

Corresponding and like parts are referred to in the following description and indicated in all the views of the drawings by the same reference characters.

Referring to the drawings, which illustrate one embodiment of the invention, the numeral 1 designates a portable support such as an ordinary sled upon which the sawing mechanism is mounted, thereby enabling the entire device to be readily drawn across a field by a horse or other draft animal, and properly positioned for operating upon any desired stump. A base 2 is arranged upon the top of the sled 1, being pivotally connected thereto at a point near one side thereof by means of a pivot bolt 3. Bearing plates or rings 4 are interposed between the top of the sled 1 and the base 2. and this mounting enables the base to be readily turned upon the pivot bolt. A frame 5 is carried by the base 2 and extends upwardly therefrom, and an overhanging beam 6 which is a continuation of the cross bar at the top of the frame 5 extends laterally from the frame. A pair of opposed arms 7 project downwardly from the overhanging beam 6 and are provided at their lower ends with guide rollers 8. The horizontal beam 6 may be conveniently formed of vertically disposed spaced sides $6^a$, in which event the upper ends of the arms 7 are secured between these spaced sides or sections, as indicated by the drawing.

A cross cut saw 9 is arranged between the lower ends of the arms 7, and has the extremities thereof secured to oppositely extending flexible cables 10. These cables 10 pass around the guide rollers 8 which are journaled within the forked lower ends of the arms 7, and are then carried upwardly to an upper set of guide rollers 11 which are journaled between the spaced sides or sections $6^a$ of the overhanging beam 6. After passing around these upper rollers 11 the cables are carried inwardly and connected by means of turn buckles 16 to opposite ends of a cross head 12. This cross head is slidably mounted upon the overhanging beam 6, being formed with a reduced intermediate portion $12^a$ (see Fig. 5) which fits loosely within the space between the sides $6^a$ of the beam. It will be obvious that as the cross head is moved back and forth the saw 9 will be reciprocated in the necessary manner for operating upon the base of a stump, such as that indicated at S. The upper and lower ends of the cross head are enlarged and slide upon the corresponding edges of the beam 6, thereby directing the cross head in its movements, and preventing it from becoming disengaged from the beam. The two downwardly extending arms 7 are held rigidly in position by means of the diagonal braces 15.

The reciprocating cross head 12 is connected by a pitman 17 to a wrist pin 18 on a main drive wheel 19 which is mounted at the top of the frame 5. This main drive wheel has a toothed periphery which meshes with a pinion 20 applied to one end of a short shaft 21, the opposite end of the short shaft having a belt and pulley connection 22 with a suitable motor or engine 23 which is mounted upon the base 2. It will be noted that the engine 23 and overhanging beam 6 are arranged on opposite sides of the pivot bolt 3, and the entire sawing mechanism is substantially balanced at this point so that the overhanging beam is free to have a slight amount of up and down movement for bringing the saw into position for cutting the stump as low as possible. It will be obvious that when the engine 23 is set into operation the main drive wheel 19 will be rotated, and that from this main drive wheel a reciprocating motion will be imparted to the cross head 12 by means of the pitman 17.

The outer end of the overhanging frame may be supported by a shoe 24 which is adapted to rest upon the ground and support the saw at the proper elevation when the saw is in use, although it is lifted above the ground when the saw is being moved from place to place. This shoe 24 is pivotally connected to the rear arm 7 at 25 and has a cam relation to the pivotal mounting so that it can be raised and lowered by swinging the shoe about its pivotal mounting. The curved portion of the shoe which is adapted to be brought into engagement with the ground has a comparatively wide and flat surface so as to obtain a proper bearing upon the ground, and the extremity thereof terminates in a hand-hold 26 which is adapted to be grasped by the operator for the purpose of swinging the entire saw about the pivot bolt 3 to feed the saw to the stump. The pivot end of the shoe is formed with an extension or arm 27 which is connected by a link 28 to a lever 29. This lever is pivoted at 30 upon the frame and a conventional latch 31 is provided for locking the lever in an adjusted position. It will thus be obvious that by manipulating this lever the shoe 24 can either be lifted entirely above the surface of the ground or swung downwardly into engagement with the ground, the cam relation between the curved portion of the shoe and the pivot bolt thereof enabling the shoe to be adjusted to hold the saw at slightly different elevations while in operation.

An arm 32 projects downwardly from an intermediate portion of the overhanging beam 6 and carries a saw guide 33 which loosely receives the blade of the saw. This saw guide is at the lower end of a lever 34 which is slotted at 35 to receive a bolt 36. A nut 37 on this bolt holds the lever loosely in engagement with a fulcrum member 38, so that the lever is free to swing or tilt to hold the saw in different angular positions and thereby provide for cutting the stump either horizontally or at a slight inclination to the horizontal. The upper end of the lever 34 is provided with an outstanding flange 39 which engages a nut 40 on a bolt 41 which passes loosely through the lever. This bolt or stem 41 is journaled in a bearing 42 in the arm of a bracket 32, and provided with a crank handle 43 by means of which it can be rotated. A spring 44 surrounds the stem 41 and is interposed between the bracket 32 and the lever 34, thereby swinging the lever 34 outwardly and holding it in engagement with the nut 40. However, it will be obvious that by manipulating the crank handle 43 and rotating the threaded stem 41 to shift the position of the nut 40 thereon the lever 34 can be tilted in either direction and the saw guide 33 adjusted to hold the saw at the proper inclination. As previously explained, the overhanging frame and the engine are located on opposite sides of the pivot bolt 3 so that they substantially balance each other. The engine sawing mechanism may be swung laterally about the pivot bolt 3, as may be necessary to feed the saw or bring it into proper position to operate upon a stump, and a limited amount of vertical swinging movement or play is also possible about the pivot bolt 3 to admit of the saw being positioned to cut as low down as possible upon the stump.

Having thus described the invention, what I claim as new and desire to secure by Letters Patent, is:—

1. A stump sawing machine including a portable support, a base pivotally mounted upon the support to turn about a vertical axis and also arranged to have a slight tilting movement, an overhanging beam carried by the base and projecting from the support, arms extending downwardly from the overhanging beam, a reciprocating saw arranged between the lower ends of the arms, means for driving the saw, and an adjustable shoe carried by the outer end of the overhanging beam.

2. A stump sawing machine including a portable support, a base pivotally mounted upon the support to turn about a vertical axis and arranged to have a slight tilting movement, an overhanging beam carried by the base and projecting laterally from the portable support, arms extending downwardly from the overhanging beam, a reciprocating saw extending between the lower ends of the arms, an engine mounted upon the base and having a driving connection with the saw, the engine and overhanging beam being arranged on opposite sides of the pivot point of the base and substantially counter-balancing each other, and an adjustable shoe carried by the outer end of the overhanging beam.

3. A stump sawing machine including a portable support, a base pivotally mounted upon the support and arranged to turn about a vertical axis, an overhanging beam carried by the base and projecting laterally from the portable support, arms extending downwardly from the overhanging beam, a cross head slidably mounted upon the overhanging beam, a reciprocating saw extending between the lower ends of the arms, flexible cables operatively connecting the saw to the cross head, guide members for the flexible cables, and driving means carried by the base and operatively connected to the cross head.

4. A sawing machine including a support, a base loosely mounted upon the support and susceptible of a slight tilting action, an upright frame carried by the base, an overhanging beam projecting laterally from the upright frame, a cross head mounted to reciprocate upon the overhanging beam, a saw arranged under the overhanging beam, flexible cables operatively connecting the ends of the saw to the cross head, guide members for the cables, driving means mounted upon the upright frame and operatively connected to the cross head, the driving means and overhanging beam being arranged on opposite sides of the loose connection between the base and support so as to substantially counter-balance each other, and an adjustable supporting shoe at the outer end of the overhanging beam.

5. A sawing machine including a support, a base pivotally mounted upon the support and also having a slight tilting action about its pivotal connection, an upright frame upon the base, an overhanging beam projecting laterally from the base, a cross head mounted to reciprocate upon the overhanging beam, arms extending downwardly from the cross head, a saw arranged between the arms, flexible cables operatively connecting the saw to the cross head, guide members for the cables, a main drive wheel journaled upon the upright frame and operatively connected to the cross head, an engine mounted upon the base and having a driving connection with the drive wheel, the engine and overhanging beam being arranged on opposite sides of the pivot point of the base so as to substantially counter-balance each other, and an adjustable shoe at the outer end of the overhanging beam.

6. A sawing machine including a support, a base pivotally mounted upon the support, an upright frame upon the base, an overhanging beam projecting laterally from the upright frame, a cross head mounted to reciprocate upon the overhanging beam, arms extending downwardly from the overhanging beam, a saw arranged between the arms, flexible cables operatively connecting the saw to the cross head, guide means for the cables, a main drive wheel journaled upon the upright frame, a pitman connecting the drive wheel to the cross head, a short shaft journaled to the drive wheel, and an engine mounted upon the base and having a driving connection with the short shaft, the engine and overhanging beam being arranged on opposite sides of the pivot point of the base and substantially counter-balancing each other, and an adjustable supporting shoe at the outer end of the overhanging beam.

7. A sawing machine including a support, an upright frame carried by the support and mounted to have a tilting movement thereon, an overhanging beam projecting laterally from the frame, a pair of arms extending downwardly from the overhanging beam, a cross head mounted to reciprocate upon the overhanging beam, a saw arranged between the lower ends of the arms, flexible cables operatively connecting the extremities of the saw to the cross head, guide members for the cables, a shoe pivotally mounted upon the outer arm and formed with a curved portion which has an eccentric relation to the pivot, and means for adjusting the shoe to hold the saw in different elevations.

8. A sawing machine including a beam projecting laterally from the frame, a pair of arms extending from the overhanging beam, a cross head mounted to reciprocate upon the overhanging beam, a saw arranged between the lower ends of the arms, flexible cables operatively connecting the extremities of the saw to the cross head, guide members for the cables, a bracket arm extending from the overhanging beam, an upright lever pivotally mounted upon the bracket arm and provided at one end thereof with a looped portion loosely engaging the saw, and means for tilting the lever to adjust the inclination of the looped portion.

In testimony whereof I have signed my name to this specification in the presence of two subscribing witnesses.

ARTHUR HAMILTON.

Witnesses:
  W. B. NAMIAN,
  J. W. ELDERS.